United States Patent [19]

Podrecca

[11] 3,984,732
[45] Oct. 5, 1976

[54] HOSE GUIDE
[76] Inventor: Michael Joseph Podrecca, P.O. Box 167, Burlingame, Calif. 94010
[22] Filed: Aug. 21, 1975
[21] Appl. No.: 606,410

[52] U.S. Cl. .................................. 317/2 D; 174/6; 239/197; 254/100; 254/19 DC
[51] Int. Cl.² ........................................ H05F 3/00
[58] Field of Search ............ 254/190 R, 190 C, 100; 239/197; 248/87, 76; 317/2 D, 2 R; 174/6; 222/527, 529

[56] References Cited
UNITED STATES PATENTS

| | | | |
|---|---|---|---|
| 2,318,340 | 5/1943 | Thacher et al. | 317/2 D |
| 2,603,432 | 7/1952 | Paulsen | 254/190 C |
| 2,947,515 | 8/1960 | Shaffer | 254/100 |
| 3,097,827 | 7/1963 | McDaniel | 254/190 C |
| 3,222,030 | 12/1965 | Thorpe | 254/100 |

Primary Examiner—Frank E. Werner
Assistant Examiner—Donald W. Underwood
Attorney, Agent, or Firm—Henry G. Kohlmann

[57] ABSTRACT

A device for preventing the entanglement or wedging of paint, water or air hoses with the tires of a vehicle being worked on. Specifically, an elongated, longitudinally extendable hose guide adapted to be engaged with the body or frame of a motor vehicle and the ground so as to provide a guide for a hose thereby preventing said hose from engaging the tires of the vehicle and additionally to provide a path to ground for any static electrical charges that may build up on the surface of the vehicle to be painted thereby reducing any bubbles or swirls in metallic paint finishes, and further eliminating the attraction of dust by the electrical charges.

5 Claims, 3 Drawing Figures

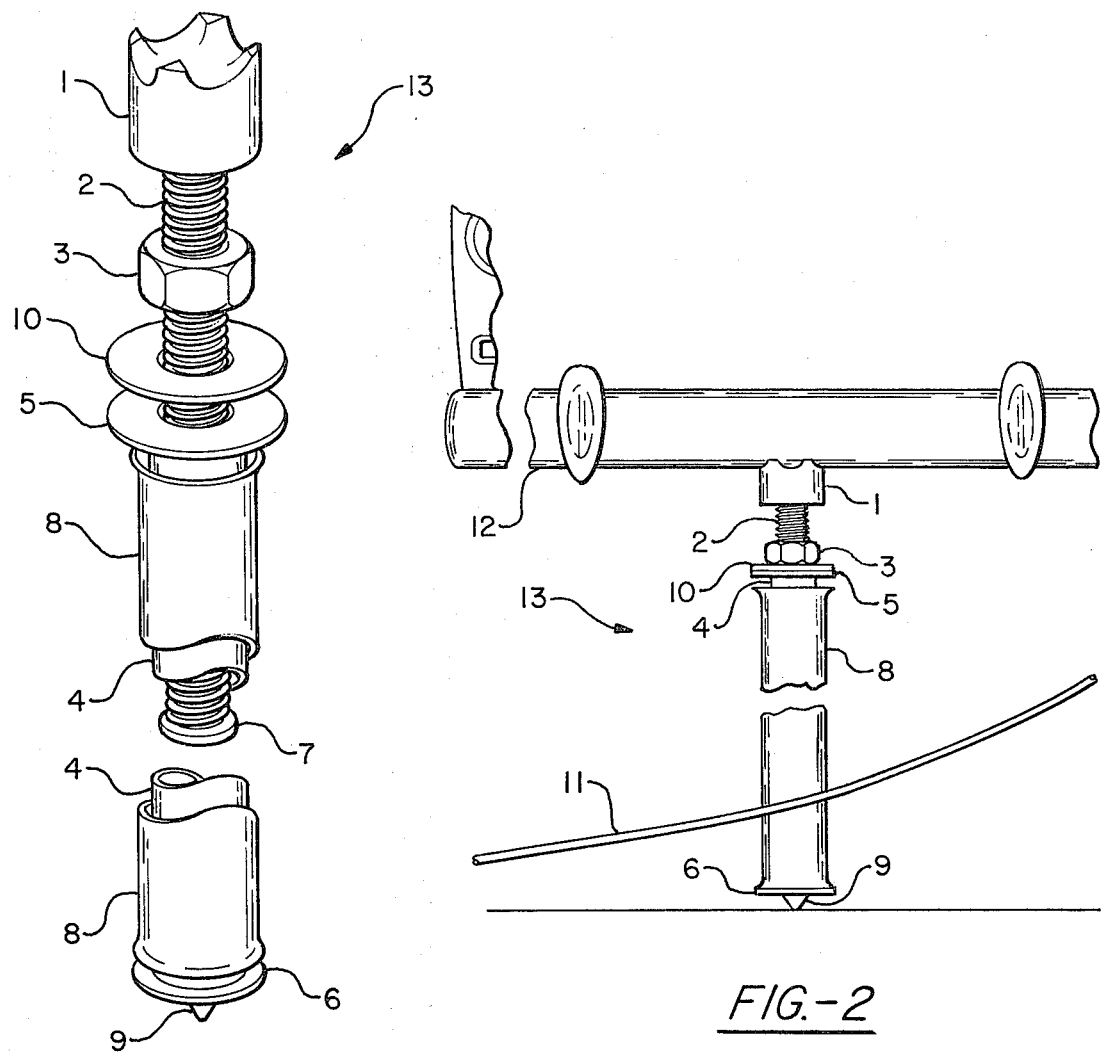
FIG.-1
FIG.-2
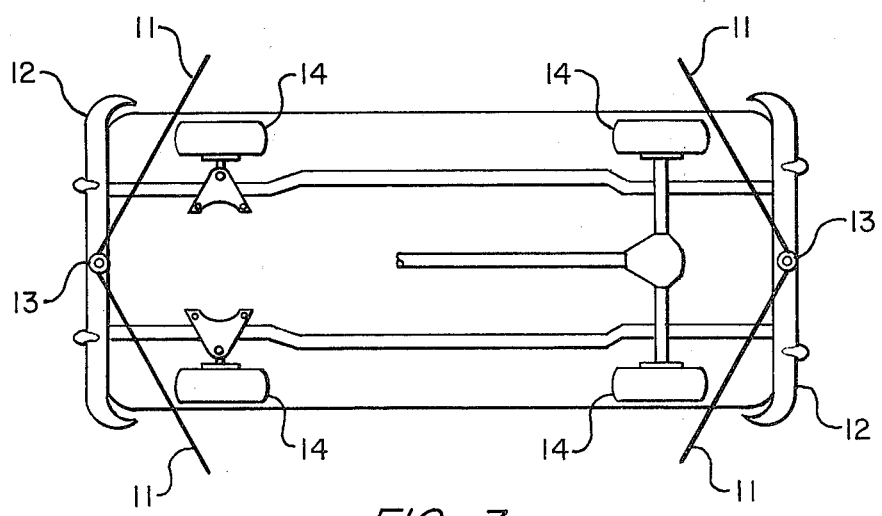
FIG.-3

HOSE GUIDE

BACKGROUND OF THE INVENTION

1. Field of the Invention

This invention relates generally to devices to be used in preventing hoses from entanglement with or wedging underneath the tires of motor vehicles when such hoses are required to perform work about the particular vehicles. More specifically this invention relates to devices which prevent paint, water or air hoses from entanglement with or wedging underneath the tires of a motor vehicle when workmen are engaged in the spray painting or washing of the particular vehicle.

2. Description of the Prior Art

The painting of motor vehicles requires the use of spray painting equipment for the application of a smooth finish to the surface of the paint applied to the motor vehicle. The use of such spray painting equipment also requires air hoses and in some cases paint hoses. Invariably as the workman applying the paint proceeds about the vehicle the hoses become entangled with the vehicle tires and can result in interruption of the smooth application of paint by the workman causing running of the paint due to excessive paint being sprayed in one spot. Further approximately 80% of the paints used on motor vehicles now contain metalic particles. The action of such paint being sprayed on the vehicle creates a build up of static electrical charges which cause bubbles and swirl marks to appear in the finish, and attract dust particles to the freshly painted surface.

Other such devices typified by the design in the patent issued to Paulsen, U.S. Pat. No. 2,603,432 provide a hose guiding feature. However, these devices are usually attached directly to the rubber tires and therefore cannot provide a ground for static electrical charges as they build up on the vehicle. Further, since these devices are attached to the wheel, four are required for each such vehicle to be painted resulting in added expense and such devices require more storage space when they are not in use.

The object of the present invention is to provide a lightweight, simplified hose guide structure which requires little storage space and may be attached directly to the vehicle body being painted at both the front and rear of said vehicle thereby reducing the number of such devices required, to two for each vehicle to be painted.

A further object of this invention is to provide a hose guide which will prevent hoses from becoming entangled with the tires of the vehicle to be painted and which also provides a path to ground for static electric charges which build up on the vehicle as it is being charged so that these charges will drain off and not interfere with the application of paints containing metalic particles, or attract dust particles to the freshly painted surface.

SUMMARY OF THE INVENTION

Briefly described, the present invention is a longitudinally extensible hose guide that may be readily attached to the body or frame of a motor vehicle so as to prevent entanglement of hoses with the tires of the vehicle and which provides a path to ground for static electrical charges. More specifically, the hose guide comprises an elongated inner tubular member having a base on one end and a cap or shoulder at the other. Attached to and underneath the base is a metal point for engagement with the ground so as to provide a non-slip base and a good electrical ground. Rotatably attached to said inner tubular member is an outer tubular member shorter than said inner tubular member and so attached between the base and shoulder plate. The base and shoulder plate being of sufficient size to prevent removal of the outer tubular member from about the inner tubular member. Further said inner tubular member is adapted for receiving a threaded member having a saddle fixedly attached on the top thereof for engaging the body or frame of a motor vehicle and a rotatably attached nut below the saddle which engages the shoulder and thereby provides longitudinal adjustment of the threaded member relative to the inner tubular member. Said hose guide may be removable attached to the motor vehicle which is to be painted by placing the saddle against the underside of the bumper of the vehicle, for example, and with the hose guide held in a substantially vertical direction adjusting the nut so as to extend the device in the longitudinal direction until it engages the ground. Such adjustment is to continue until sufficient weight of the vehicle is born by the hose guide to prevent it from being dragged or pulled out of position by the hoses which come in contact with the guide.

The several advantages of the present device will be more readily apparent, understood and appreciated by reference to the detailed description which is to be considered in conjunction with the accompanying drawings.

BRIEF DESCRIPTION OF THE DRAWINGS

FIG. 1 is a perspective view of the hose guide.

FIG. 2 is a side view of the hose guide in operating position.

FIG. 3 is a top view of a pair of the hose guides in position.

DESCRIPTION OF THE PREFERRED EMBODIMENT

Referring to FIGS. 1 and 2 a hose guide 13 comprises a saddle 1, fixedly attached to the top of a threaded member 2 having a nut 3 rotatably attached thereto below the saddle 1. Said threaded member 2 is slidably received by an inner tubular member 4. A shoulder 5, having a hole for receiving threaded member 2 is fixedly attached to the end of inner tubular member 4 which receives the threaded member 2 and a base 6 is fixedly attached to the other end of inner tubular member 4. Threaded member 2 has an end plate 7 of greater diameter than the hole in shoulder 5 but of smaller diameter than inner tubular member 4 fixedly attached at the end opposite the saddle 1, thereby preventing removal of threaded member 2 from inner tubular member 4. Rotatably attached to inner tubular member 4 between the shoulder 5 and the base 6 and containing inner tubular member 4 is an outer tubular member 8. Fixedly attached to the bottom of the base 6 is a conical point 9 which provides the electrical ground for bleeding off of static electrical charges and also provides a non-slip contact with the ground.

In actual operation it has been found that the ends of outer member 8 should be flared so as to reduce friction against member 6 and also to keep the hose 11 as shown in FIG. 3 riding on outer member 8 and prevent rubbing against either the base 6 or the shoulder 5.

Also, a washer 10, has been added between the nut 3 and the shoulder 5 so as to reduce friction between nut 3 and shoulder 5 and also to provide added strength at the point of adjustment of hose guide 13.

FIGS. 2 and 3 show hose guide 13 in operation. The saddle 1 is placed against the body or frame of the vehicle, in this case a bumper 12, and nut 3 is rotated causing longitudinal extension of hose guide 13 until conical point 9 comes in contact with the ground and with the longitudinal axis of hose guide 13 in a substantially vertical position. Additional longitudinal extension of the hose guide 13 insures sufficient weight of the vehicle upon hose guide 13 to prevent the hose 11 from dragging or pulling the device out of position. Hose 11 is then guided away from the tires 14 of the vehicle as shown in FIG. 3. The metal construction of the saddle 1, the threaded member 2, nut 3, washer 10, shoulder 5, inner tubular member 4, base 6 and conical pin 9 provide the electrical ground for draining static electrical charges and thereby prevent bubbles and swirls from appearing in the painted surface of the vehicle or dust particles from being attracted to the freshly painted surface. In this case steel materials were used for sufficient strength to support part of the weight of the vehicle, however any electrical conductive materials of sufficient strength may be used. Outer member 8 need not be electrically conductive.

What is claimed is:

1. An electrically conductive hose guide adapted to be positioned between the body or frame of a motor vehicle and the ground comprising
    a. an electrically conductive inner tubular member,
    b. electrically conductive means co-operating with said inner tube member for extending said hose guide in the longitudinal direction, and
    c. an outer tubular member, freely rotatably and coaxial with said inner tubular member whereby said hose guide may be longitudinally extended and placed in contact with and between the body or frame of a motor vehicle and the ground so as to provide a guide for hoses used about the vehicle and a path to ground for draining off static electrical charges.

2. In a hose guide as described in claim 1, said means comprising:
    a. a threaded member one end of which is slidably received by said inner tubular member,
    b. a saddle attached at the opposite end of said threaded member, and
    c. a nut between said saddle and said inner tubular member, rotatably attached to said threaded member.

3. In a hose guide as described in claim 1, said outer tubular member having flared ends.

4. In a hose guide as described in claim 1, said inner tubular member comprising:
    a. a shoulder having a hole for receiving said means for extending,
    b. an elongated tubular member fixedly attached to said shoulder, and
    c. a base fixedly attached to said tubular member opposite the point of attachment of said shoulder.

5. In a hose guide as described in claim 4, said base having a conical point attached to the bottom thereof, whereby a good electrical ground and non-slip support is provided.

* * * * *